United States Patent
Culha

(10) Patent No.: US 9,487,402 B2
(45) Date of Patent: Nov. 8, 2016

(54) PRODUCTION METHOD FOR THE BORON NITRIDE NANOTUBES

(71) Applicant: YEDITEPE UNIVERSITESI, Istanbul (TR)

(72) Inventor: Mustafa Culha, Istanbul (TR)

(73) Assignee: YEDITEPE UNIVERSITESI, Istanbul (TR)

( * ) Notice: Subject to any disclaimer, the term of this patent is extended or adjusted under 35 U.S.C. 154(b) by 0 days.

(21) Appl. No.: 14/898,474

(22) PCT Filed: Jun. 14, 2013

(86) PCT No.: PCT/IB2013/054883
§ 371 (c)(1),
(2) Date: Dec. 14, 2015

(87) PCT Pub. No.: WO2014/199200
PCT Pub. Date: Dec. 18, 2014

(65) Prior Publication Data
US 2016/0145101 A1 May 26, 2016

(51) Int. Cl.
*C01B 21/064* (2006.01)

(52) U.S. Cl.
CPC ....... *C01B 21/0646* (2013.01); *C01B 21/0648* (2013.01); *C01P 2002/72* (2013.01); *C01P 2002/82* (2013.01); *C01P 2002/84* (2013.01); *C01P 2004/04* (2013.01); *C01P 2004/13* (2013.01); *C01P 2004/133* (2013.01); *C01P 2004/64* (2013.01)

(58) Field of Classification Search
None
See application file for complete search history.

(56) References Cited

U.S. PATENT DOCUMENTS

| 7,341,702 B2 * | 3/2008 | Pultz, Jr. | C01B 21/064 423/290 |
| 2012/0141348 A1 * | 6/2012 | Yoshihara | C01B 21/0645 423/290 |

FOREIGN PATENT DOCUMENTS

| CN | 101062765 A | 10/2007 |
| CN | 102874776 A | 1/2013 |

OTHER PUBLICATIONS

Kahramansoy; Production of Hexagonal Boron Nitride by Carbothermic Reduction of Colemanite-Boric Oxide Mixtures; A Thesis Submitted to Graduate School of Natural and Applied Sciences of Middle East Technical University; Sep. 2011.*
Choi et al.; Preparation of Boron Compound from Calcium Borate, Colemanite: Synthesis of Hexagonal Boron Nitride from Boric Oxide (III); Journal of Korean Ceramic Society; vol. 41, No. pp. 812-818; 2004.*
Celik et al.; Determination of the Optimum Conditions for Boric Acid Extraction with Carbon dioxide Gas in Aqueous Media from Colemanite Containing Arsenic; Ind. Eng. Chem. Res.; 39, 488-493; 2000.*

(Continued)

*Primary Examiner* — Guinever S Gregorio
(74) *Attorney, Agent, or Firm* — Gokalp Bayramoglu

(57) ABSTRACT

The present invention relates to a method, which essentially comprises the steps of performing crude boron nitride nanotube (BNNT) synthesis (110) and purifying BNNTs obtained in the crude form (120), and wherein direct BNNT production is provided with the use of colemanite that is a borate mineral.

14 Claims, 5 Drawing Sheets

(56) References Cited

OTHER PUBLICATIONS

Burcu Saner Okan et al: "Effect of Reaction Temperature and Catalyst Type on the Formation of Boron Nitride Nanotubes by Chemical Vapor Deposition and Measurement of Their Hydrogen Storage Capacity", Industrial & Engineering Chemistry Research, vol. 51, No. 35, Sep. 5, 2012, pp. 11341-11347, XP055105607.

Lin et al: "Thermal-heating CVD synthesis of BN nanotubes from trimethyl borate and nitrogen gas", Materials Chemistry and Physics, vol. 107, No. 1, Nov. 27, 2007, pp. 115-121, XP022362244.

Dmitri Golberg et al: "Boron Nitride Nanotubes and Nanosheets", vol. 4, No. 6, Jun. 22, 2010, pp. 2979-2993, XP055105680.

Nasreen G. Chopra et al: "Boron Nitride Nanotubes", Science, New Series, vol. 269, No. 5226(Aug. 18, 1995), 966-967.

Konstantin B. Shelimov et al: "Composite Nanostructures Based on Template-Grown Boron Nitride Nanotubules", Chem. Mater., vol. 12, No. 1, 2000, 250-254.

Wen-Qiang Han et al: "Synthesis of aligned BxCyNz Nanotubes by a substitution-reaction route". Chemical physics Letters 345(2001) 368-372.

Jun Yu et al: "In situ formation of BN Nanotubes during Nitriding Reactions", Chem. Meter. 2005, 17, 5172-5176.

S K Singhal et al: "Synthesis and characterization of boron nitride nanotubes using a simple chemical method", Indian Journal of Engineering&Materials Science, vol. 15, Oct. 2008, 419-424.

Bo Zhong et al: "Large-scale fabrication of boron nitride nanotubes via a facile chemical vapor reaction route and their cathodoluminescence properties", http://www.nanoscalereslett.com/content/6/1/36.

Jiesheng Wnag et al: "Low temperature growth of boron nitride nanotubes on substrates", Nano letters 2005, vol. 5, No. 12, 2528-2532.

\* cited by examiner

PRODUCTION METHOD FOR THE BORON NITRIDE NANOTUBES

FIELD OF THE INVENTION

The present invention relates to a new method wherein the direct boron nitride nanotube production is provided with the use of colemanite which is a borate mineral.

BACKGROUND OF THE INVENTION

One of the nanotube types is boron nitride nanotube (BNNTs), and it has boron and nitrogen atoms following each other at the corners of hexagons on graphene plane. The synthesis of boron nitride nanotubes (BNNT), which are the structural analogues of carbon nanotubes (CNT), can be performed with the similar methods used in the synthesis of carbon nanotubes. BNNTs are more resistant to high temperatures and chemical corrosion than the CNTs are and they have two times higher hydrogen storage capacity compared to CNTs.

Many methods have been used in synthesis of BNNT until now. First of these is arc discharge method. In the following years, chemical vapor deposition, laser ablation, ball milling and many other methods were used.

In many articles disclosing template assisted boron nitride nanotube synthesis, one of the methods known in the state of art, used carbon nanotubes (CNT) or aluminum filters as templates. CNTs are reacted with $B_2O_3$ and $NH_3$ gases, and the carbon (C) atoms are replaced with B and N atoms. Therefore, the production of $B_xC_yN_z$ tubes is possible. However, in the said method, impure BNNT products are obtained since the carbons cannot be replaced completely.

Another method in the state of the art is chemical vapor deposition (CVD) method. Many articles disclosing BNNT production with this method have been published.

Chinese Patent document no CN102874776, an application known in the state of the art, discloses a method for producing BNNTs. The said method comprises the steps of mixing amorphous boron powder, CaO and hydrochloric acid, and heating to temperatures of 1000-1100° C. Furthermore, in one embodiment of the invention, it is disclosed that borax is used.

SUMMARY OF THE INVENTION

The objective of the present invention is to provide a production method for BNNTs wherein the colemanite is directly used as the boron source.

A further objective of the present invention is to provide a production method for boron nitride nanotubes which enables to obtain the product with high purity and low cost.

BRIEF DESCRIPTION OF THE DRAWINGS

A production method for boron nitride nanotubes developed to fulfill the objective of the present invention is illustrated in the accompanying figures, wherein.

DETAILED DESCRIPTION OF THE INVENTION

Figure 1:
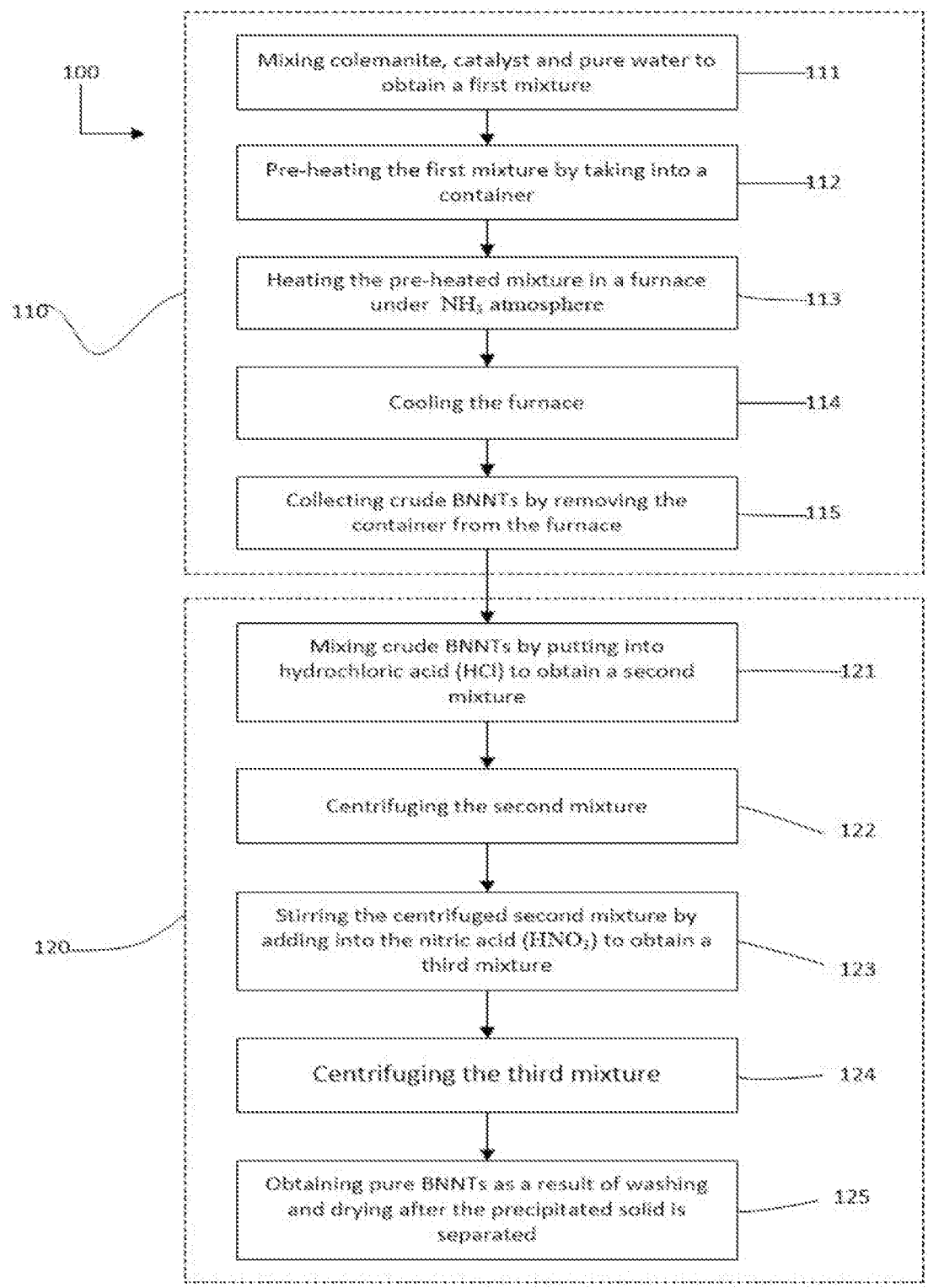
FIG. 1 is flow chart of the inventive method.

A production method for boron nitride nanotubes (BNNT) (100) developed to fulfill the objective of the invention comprises the steps of:
synthesizing crude BNNT (110):
 mixing colemanite, catalyst and pure water to obtain a first mixture (111),
 pre-heating the first mixture by taking into a container (112),
 heating the pre-heated mixture in a furnace (113),
 cooling the furnace (114),
 collecting crude BNNTs by removing the container from the furnace (115);
purifying BNNTs obtained in crude form (120),
 mixing crude BNNTs by putting into hydrochloric acid (HCl) solution to obtain a second mixture (121),
 centrifuging the second mixture (122),
 stirring, the centrifuged mixture by adding into the nitric acid ($HNO_3$) solution to obtain a third mixture (123).
 centrifuging the third mixture (124),
 obtaining pure BNNTs as a result of washing and drying after the precipitated solid is separated (125).

In the inventive method (100), first boron nitride nanotubes are prepared in crude form (110) and then they are purified by applying several processes (120). With this purpose, first colemanite and catalyst are added into the pure water to form a suspension, and this suspension is stirred until a homogenous distribution is obtained (111). In the preferred embodiment of the invention, at least one of the metal oxides such as iron oxide ($Fe_2O_3$) magnesium oxide (MgO) is used as catalyst. Preferably, 0.15-0.17 g metal oxide is used per 2 g colemanite. In one embodiment of the invention, this ratio is 0.166 g catalyst per 2 g colemanite. The pure water, which is used, is 2 mL.

The mixture, which is prepared, is poured into a high temperature resistant container in next step, and subjected to pre-heating process, thus the water is enabled to evaporate (112). In the preferred embodiment of the invention, pre-heating process (112) is performed in an alumina boat for 10-20 minutes at 150-180° C.

The boat, which holds the mixture, is placed in the center of a tubular furnace and a pre-heating step is applied to remove water from the mixture, and then heating is performed under the $NH_3$ atmosphere (113). In the preferred embodiment of the invention, the mixture is heated in a furnace with a heating rate of 8° C./minute until the temperature reaches 1250-1300° C. for 3 hours (113).

Then, the furnace is left to cool and crude BNNT is obtained (114). In the preferred embodiment of the invention, the furnace is cooled to 500-550° C. The container in which the crude BNNTs are present is removed from the cooled furnace, and the crude BNNTs are collected and preserved in room conditions (115).

The said crude BNNTs, which are obtained, are first stirred in 50 mL of 4 M HCl solution for 4 hours at 90° C. for purification (121). Then, the same mixture is centrifuged for 30 minutes at 14000 rpm (122). The product obtained from this step is taken in to a 30 mL of 1 M $HNO_3$ solution and stirred for 6 hours at 30° C. (123), and the said mixture is centrifuged for another 30 minutes at 14000 rpm (124). The solid product precipitated after the last centrifuging (124) is separated, washed with pure water and dried at 50-60° C. (125). The purity level of the boron nitride nanotubes obtained as a result can reach to about 99%.

Figure 2:
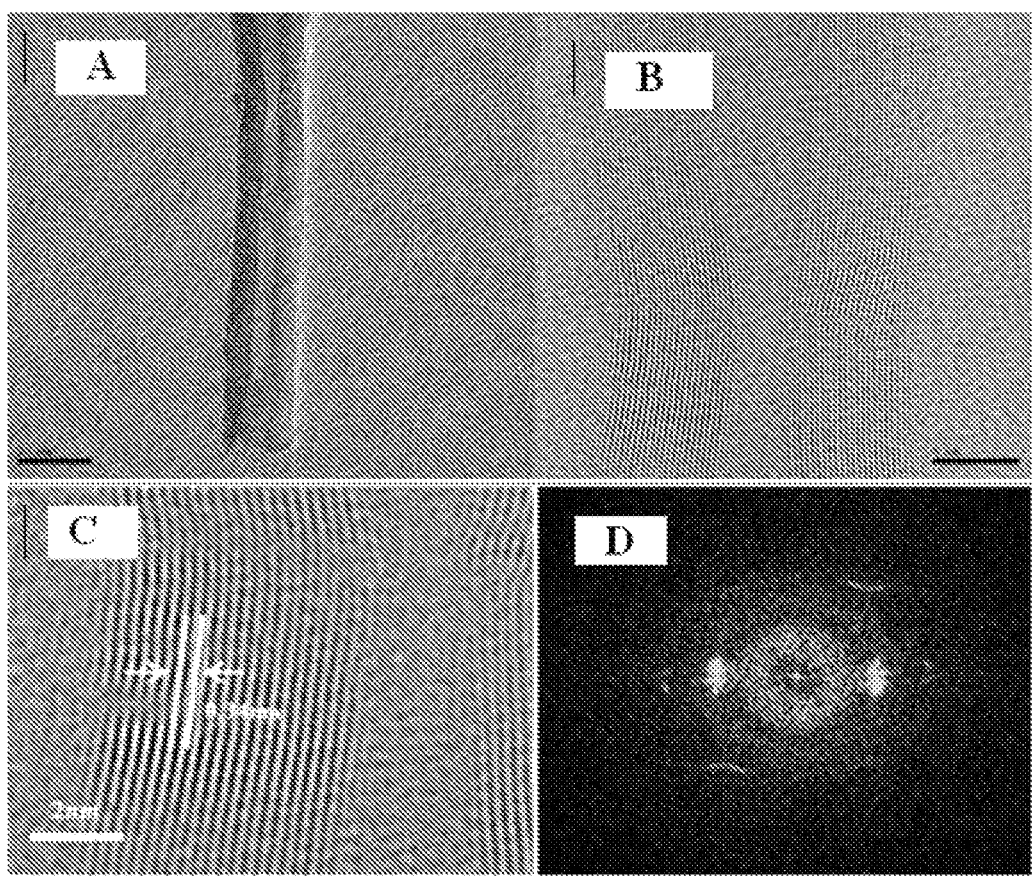
FIG. 2 is the views of the TEM and HRTEM analysis of BNNTs obtained with the inventive method.

According to the TEM images given in FIG. 2, BNNTs produced with the inventive method multi-walled, single crystalline, have outer diameter varying in the range of 10-30 nm. In addition, it is seen that the said BNNTs are open ended (FIG. 2, A), and the wall thicknesses vary in the range of 5-6 nm (FIG. 2, B). According to the selected area diffraction images from the high resolution transmission electron microscope the distance between each wall is 0.34 nm, the sidewalk are well crystallized h-BN (FIG. 2, C).

Figure 3:
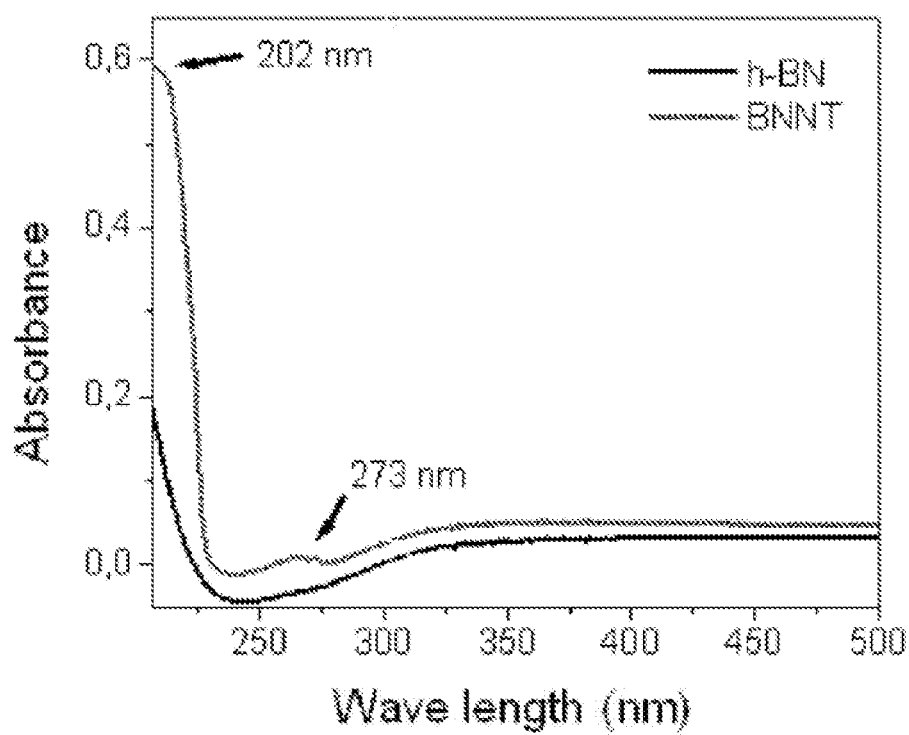
FIG. 3 is the UV spectroscopy view of the BNNTs obtained with the inventive method.
Figure 4:
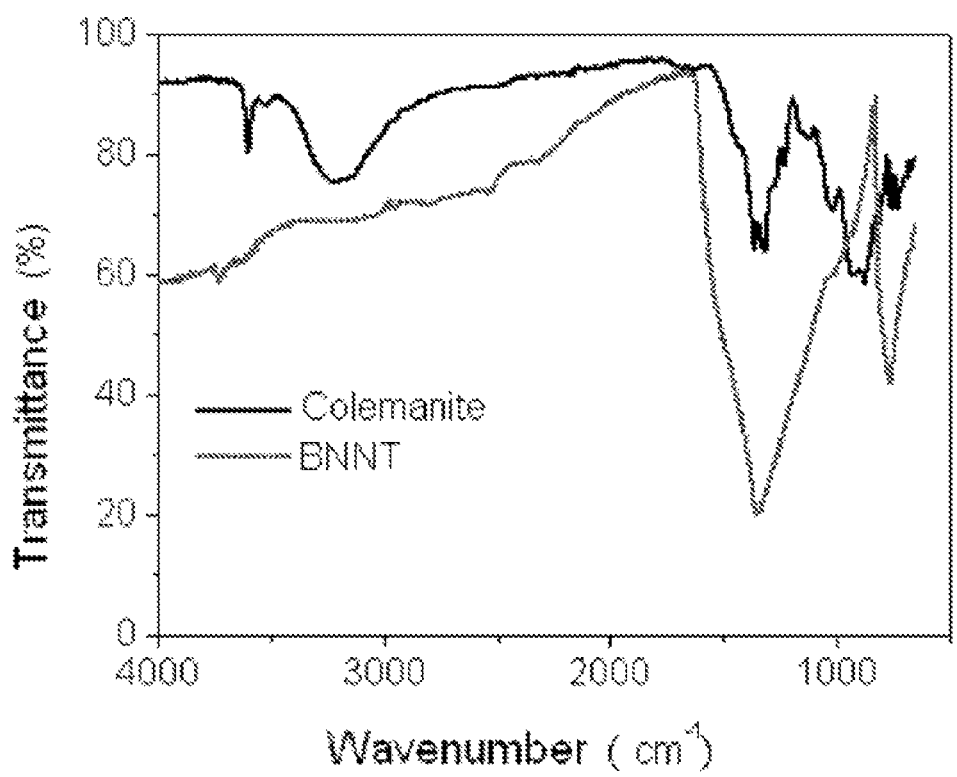
FIG. 4 is the FTIR view of the BNNTs obtained with the inventive method.
Figure 5:
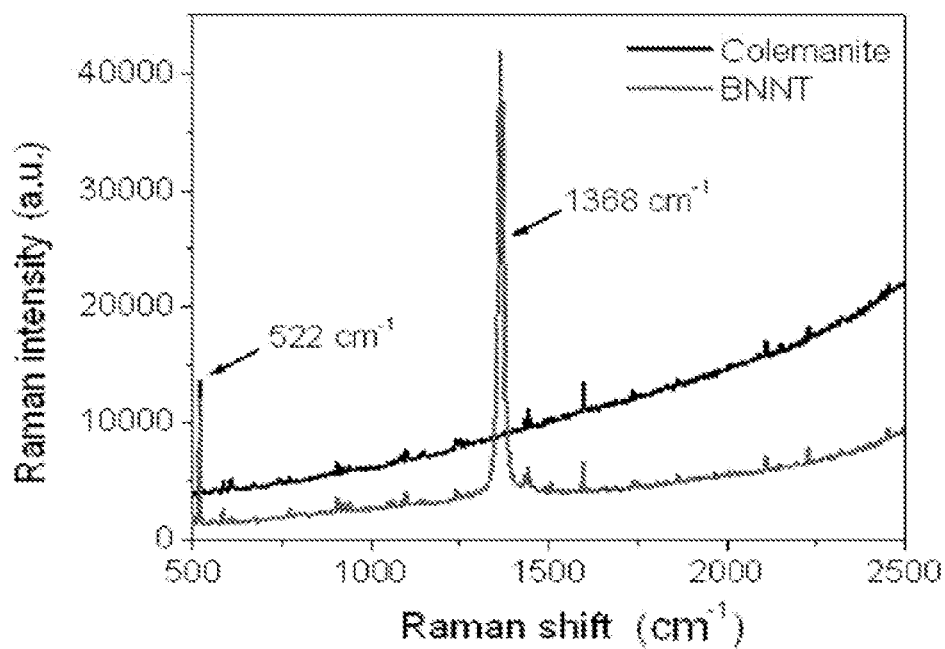
FIG. 5 is the Raman microscopy view of the BNNTs obtained with the inventive method.
Figure 6:
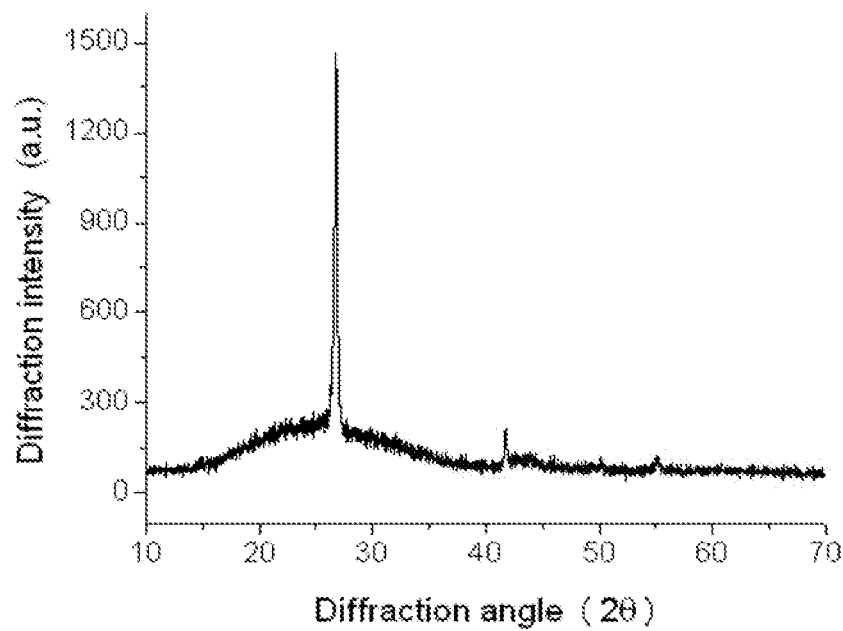
FIG. 6 is the XRD (X-ray Diffraction) view of the BNNTs obtained with the inventive method.

The BNNTs obtained with the inventive method are examined with UV (FIG. 3), FITR (FIG. 4), Raman microscopy (FIG. 5) and XRD (FIG. 6) systems. Band-gap transition peak is seen at 200 nm caused from h-BN structure in UV_Vis spectrum of BNNT and h-BN. Furthermore, shoulder shaped absorption peak that may be caused by Van Hove singularity is seen at 273 nm in BNNT. The said absorption peaks were observed as characteristics in original or functional BNNTs. When 514 nm Ar laser is used, BNNT typically gives a sharp peak at 1368 $cm^{-1}$ on the Raman spectrum. The said peak shows the $E_{2g}$ plane model of h-BN web, and it originates from the atomic vibration between B and N atoms present in the same plane. No vibration peak is observed on the Raman spectrum under the same conditions. FTIR spectrum taken from pure BNNT is same with many FTIR spectrums of BNNT present in the literature (FIG. 4). In FTIR spectrum, B-N-B inplane bonding vibration peak is observed at 1327 $cm^{-1}$, and secondary absorption peak belonging to h-BN is observed at 758 $cm^{-1}$. However, in the BNNTs produced with the inventive method performed with the use of colemanite, peaks are observed at 3600 $cm^{-1}$ (sharp), 3200 $cm^{-1}$ (broad), 1356 $cm^{-1}$, 1305 $cm^{-1}$, 886 $cm^{-1}$. In XRD pattern analysis of BNNT, the presence of a single and dominant h-BN phase the 2θ angles of which are 26.8° and 41.8° was confirmed. Furthermore, according to the XRD results, there is no impurity in BNNT that may originate from colemanite or catalyst such as $Fe_2O_3$, CaO, $SiO_2$, $Al_2O_3$, MgO, SrO or $Na_2O$.

The invention claimed is:

1. A method for producing boron nitride nanotubes (BNNTs), comprising the steps of:
    synthesizing crude BNNTs, wherein the step of synthesizing the crude BNNTs further comprises sub-steps of:
        mixing colemanite, catalyst and pure water to obtain a first mixture;
        pre-heating the first mixture after taking the first mixture into a container;
        heating the pre-heated first mixture in a furnace under $NH_3$ atmosphere;
        cooling the furnace;
        collecting crude BNNTs by removing the container from the furnace to obtain the crude BNNTs; and
    purifying the crude BNNTs, wherein the step of purifying the crude BNNTs comprising the sub-steps of;
        mixing, the crude BNNTs with a hydrochloric acid (HCl) solution after adding the crude BNNTs into the hydrochloric acid (HCl) solution to obtain a second mixture;
        centrifuging the second mixture;
        stirring the centrifuged second mixture after adding the centrifuged second mixture into a nitric acid ($HNO_3$) solution to obtain a third mixture;
        centrifuging the third mixture;
        obtaining pure BNNTs as a result of washing and drying after the precipitated solid is separated.

2. The method for producing the boron nitride nanotubes according to claim 1, wherein the catalyst comprises at least one of metal oxides.

3. The method for producing the boron nitride nanotubes according to claim 2, wherein 0.15-0.17 g metal oxide and 2 mL of pure water are used per 2 g of colemanite in the step of mixing the colemanite, catalyst and the pure water.

4. The method for producing the boron nitride nanotubes according to claim 2, wherein the metal oxides are $Fe_2O_3$ or MgO or the combination thereof.

5. The method for producing the boron nitride nanotubes according to claim 1, wherein the step of pre-heating the first mixture in a container further comprises a sub-step of vaporizing the pure water by heating at 150-180° C. for 10-20 minutes in an alumina boat.

6. The method for producing the boron nitride nanotubes according to claim 1, wherein the container which holds the first mixture, is placed in the center of a tubular furnace and the pre-heating step is applied to remove water from the first mixture, wherein the pre-heating step is performed under the $NH_3$ atmosphere in a high temperature furnace.

7. The method for producing the boron nitride nanotubes according to claim 6, wherein the first mixture is heated in a furnace with a heating rate of 8° C./minute for 3 hours until the temperature reaches 1250-1300° C. in step of heating the first mixture in the high temperature furnace.

8. The method for producing the boron nitride nanotubes according to claim 7, wherein the temperature of the furnace is decreased to 500-550° C. in step of cooling the furnace.

9. The method for producing the boron nitride nanotubes according to claim 1, wherein the container in which the BNNTs are present is removed from the cooled furnace and the BNNTs therein are collected and preserved in dry room conditions in step of collecting the crude BNNTs by removing the container from the furnace.

10. The method for producing the boron nitride nanotubes (100) according to claim 1, the crude BNNTs are stirred in 50 mL of 4 M HCl solution for 4 hours at 90° C. in the step of mixing the crude BNNTs by adding into the hydrochloric acid (HCl) solution.

11. The method for producing the boron nitride nanotubes according to claim 1, wherein the second mixture stirred in HCl acid solution is subjected to centrifuging for 30 minutes at 14000 rpm in the step of centrifuging the mixture.

12. The method for producing the boron nitride nanotubes according to claim 1, wherein the centrifuged second mixture is taken to 30 ml, of 1 M $HNO_3$ solution and stirred for 6 hours at 30° C. in the step of stirring the centrifuged second mixture by adding into the nitric acid ($HNO_3$) solution.

13. The method for producing the boron nitride nanotubes according to claim 1, wherein the third mixture stirred in $HNO_3$ solution is subjected to centrifuging for 30 minutes at 14000 rpm in the step of centrifuging the third mixture.

14. The method for producing the boron nitride nanotubes according to claim 1, wherein the BNNTs precipitated are dried at 50-60° C. in step of obtaining pure BNNTs as a result of washing and drying the precipitated solid by separating.

* * * * *